Patented Nov. 15, 1938

2,136,401

UNITED STATES PATENT OFFICE 2,136,401

ACYL COMPOUNDS OF CYANHYDRINS OF THE ETIO - CHOLANE AND ETIO - ALLO-CHOLANE SERIES AND A METHOD OF PRODUCING THE SAME

Lothar Strassberger, Berlin-Wilmersdorf, Germany, assignor to Schering-Kahlbaum A. G., Berlin, Germany, a corporation of Germany No Drawing. Application February 27, 1937, Serial No. 128,138. In Germany March 2, 1936

9 Claims. (Cl. 260—397)

This invention relates to acyl compounds of cyanhydrins of compounds of the etio-cholane and etio-allo-cholane series and a method of producing the same.

The process for the manufacture of cyanhydrins is described in the copending application Serial No. 58,754 and consists in bringing saturated or unsaturated etio-cholanones or etio-allocholanones into reaction with hydrocyanic acid.

According to the invention, these cyanhydrins by treatment with such substances which serve as reagents on alcoholic hydroxyl groups and thus form esters, as, for example, acid anhydrides, acid chlorides, cyanic acid, its isomers and derivatives, such as phenyl isocyanate and the like, are converted into the corresponding acyl derivatives which in contradistinction to the cyanhydrins are characterized by great stability.

The new acyl compounds are likewise intended to find application as intermediate products for the manufacture of substances of high physiological activity.

The reaction may, for example, be illustrated in detail by the following scheme for the cyanhydrin of androstenolone acetate:

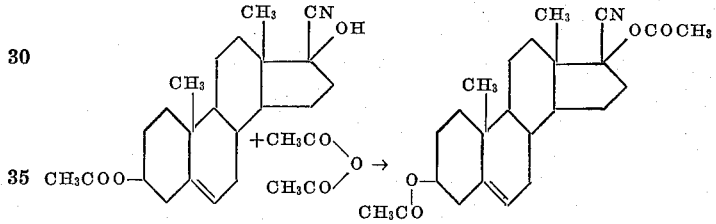

The following examples illustrate the invention:

Example 1

5 grams of androstenolone cyanhydrin are heated with 30 cc. of acetic anhydride first for one hour to 100–110° C. and thereupon for a further hour to 130–140° C. The excess of acetic anhydride is distilled off in vacuum, and the residue recrystallized from methanol. There is thus obtained the androstenolone cyanhydrin diacetate in the form of colorless crystals of M. P. 210° C.

Example 2

5 grams of androstenolone acetate cyanhydrin are treated as described in Example 1. There is thus obtained the same androstenolone cyanhydrin diacetate.

Example 3

0.5 gram of trans-androsterone cyanhydrin is treated according to Example 1 with 3 ccs. of acetic anhydride. There is obtained the corresponding diacetate in a yield of about 75% of the theory.

Instead of acetic anhydride also other acylating agents can be employed, as, for example, benzoyl chloride, propionic acid anhydride, succinic acid anhydride and the like.

Also the reaction is not limited to the cyanhydrins of the androstenolone compounds. Thus in addition, for example, androstenolones and also their esters and ethers or their other derivatives with converted hydroxyl groups, in which these hydroxyl groups can easily be restored by hydrolysis, can be employed as starting materials.

Also among other things it may be of advantage to treat the cyanhydrins with such acylating agents as form mixed esters of the diol compounds, that is to say therefore as starting materials such esters are employed, the acid radical of which is different from the acid radical employed for the acylation. The reaction can be carried out by customary methods as is known for acylations; thus, the process can be conducted in the presence of solvents, catalysts and the like.

The term "cholanone" as employed herein embraces not only the saturated but also the nuclearly unsaturated compounds.

Of course, many changes and variations in the reaction conditions, the agents used and the like may be employed by those skilled in the art in accordance with the principles set forth herein and in the claims annexed hereto.

What I claim is:

1. Process for the manufacture of acyl compounds of cyanhydrins of the etio-cholane and etio-allo-cholane series, wherein the cyanhydrins are treated with such substances as will react on tertiary alcoholic hydroxyl groups and thereby form esters.

2. Process as claimed in claim 1, in which the starting material comprises a cyanhydrin of a member of the group consisting of androstenolone and its derivatives, wherein the hydroxyl group has been substituted by a group which can be replaced by the hydroxyl group.

3. Process as claimed in claim 1 in which the esterifying agent is a member of the group consisting of acid anhydrides, acid chlorides, and cyanic acid, its isomers and derivatives, including phenyl-isocyanate.

4. Process for the manufacture of acyl compounds of cyanhydrins of the etio-cholane and etio-allo-cholane series, which comprises reacting a cyanhydrin of the etio-cholane and etio-allo-cholane series with an acylating agent in the presence of a solvent and of a catalyst.

5. An acyl compound of the cyanhydrins of the etio-cholane and etio-allo-cholane series having the general formula $C_{19}H_n(OAc)(CN)X$, wherein $n$ indicates 27 or 29, X a group that, upon hydrolysis, is reconvertible into the hydroxy group and is in the 3-position and Ac an acyl group.

6. An acyl compound of the cyanhydrin of the etio-cholane and etio-allo-cholane series having the general formula $C_{19}H_{29}(OAc)(CN)X$, and the structural formula

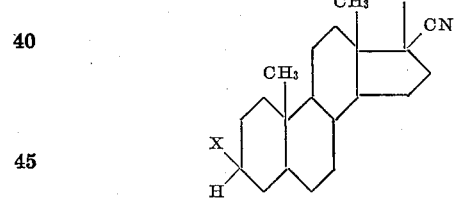

wherein X indicates a group that, upon hydrolysis, is reconvertible into the hydroxy group and is in the 3-position, and Ac an acyl group.

7. An acyl compound of the cyanhydrin of the etio-cholane series having the general formula $C_{19}H_{27}(OAc)(CN)X$ and the structural formula

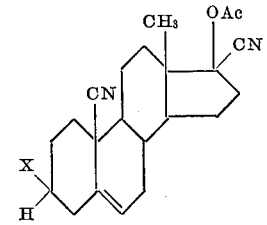

wherein X indicates a group that, upon hydrolysis, is reconvertible into the hydroxy group and is in the 3-position, and Ac an acyl group.

8. A diacetyl compound of trans-androsterone cyanhydrin having the general formula $C_{19}H_{29}(O\ acetyl)_2(CN)$ and the structural formula

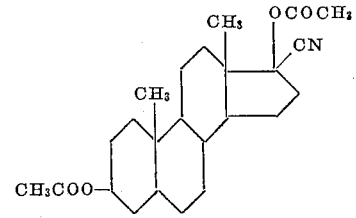

9. A diacetyl compound of androstenolone cyanhydrin having the general formula $C_{19}H_{27}(O\ acetyl)_2(CN)$ and the structural formula

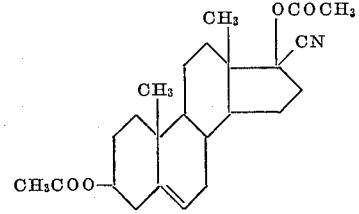

LOTHAR STRASSBERGER.